May 7, 1946.  J. E. WOOD  2,399,902
GAME OF TRAVEL
Filed Jan. 15, 1945  4 Sheets-Sheet 1
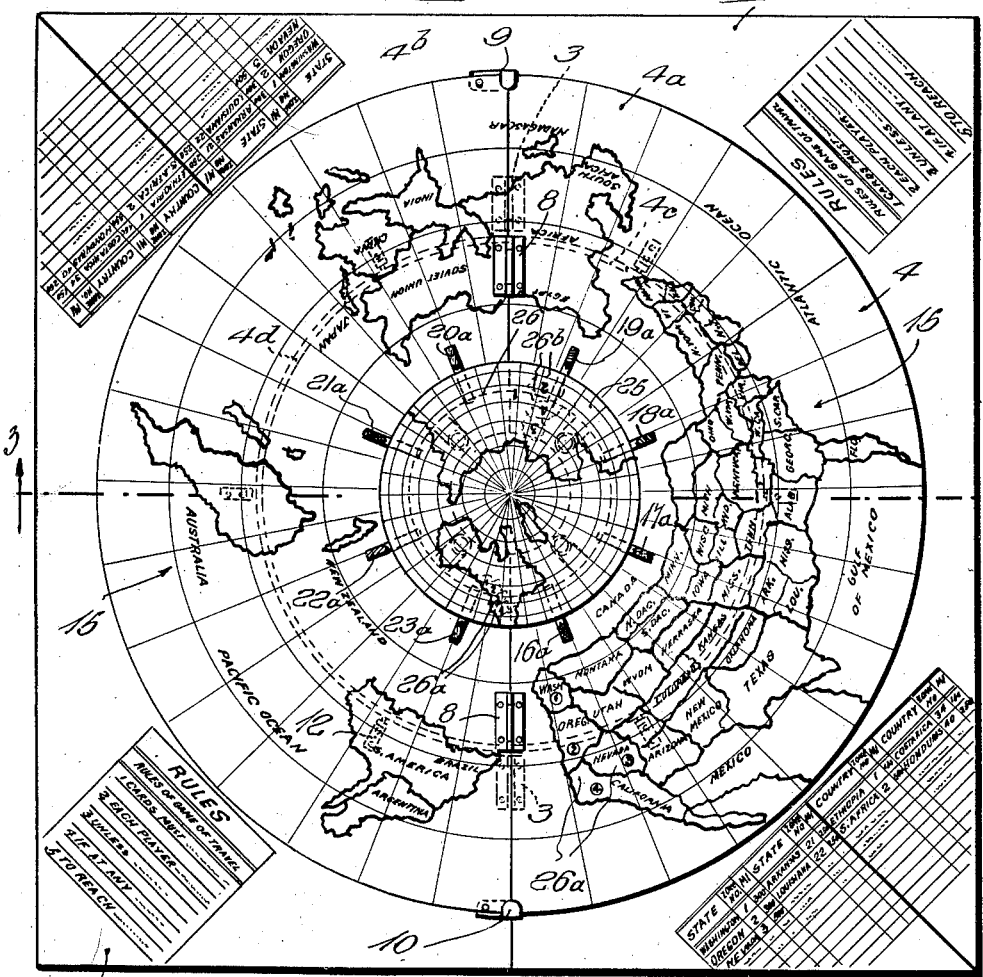
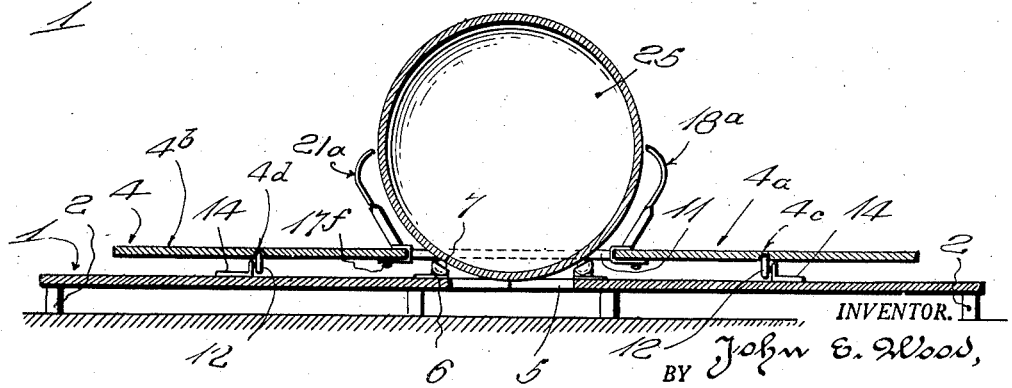
INVENTOR.
BY John E. Wood,
John B. Brady
ATTORNEY

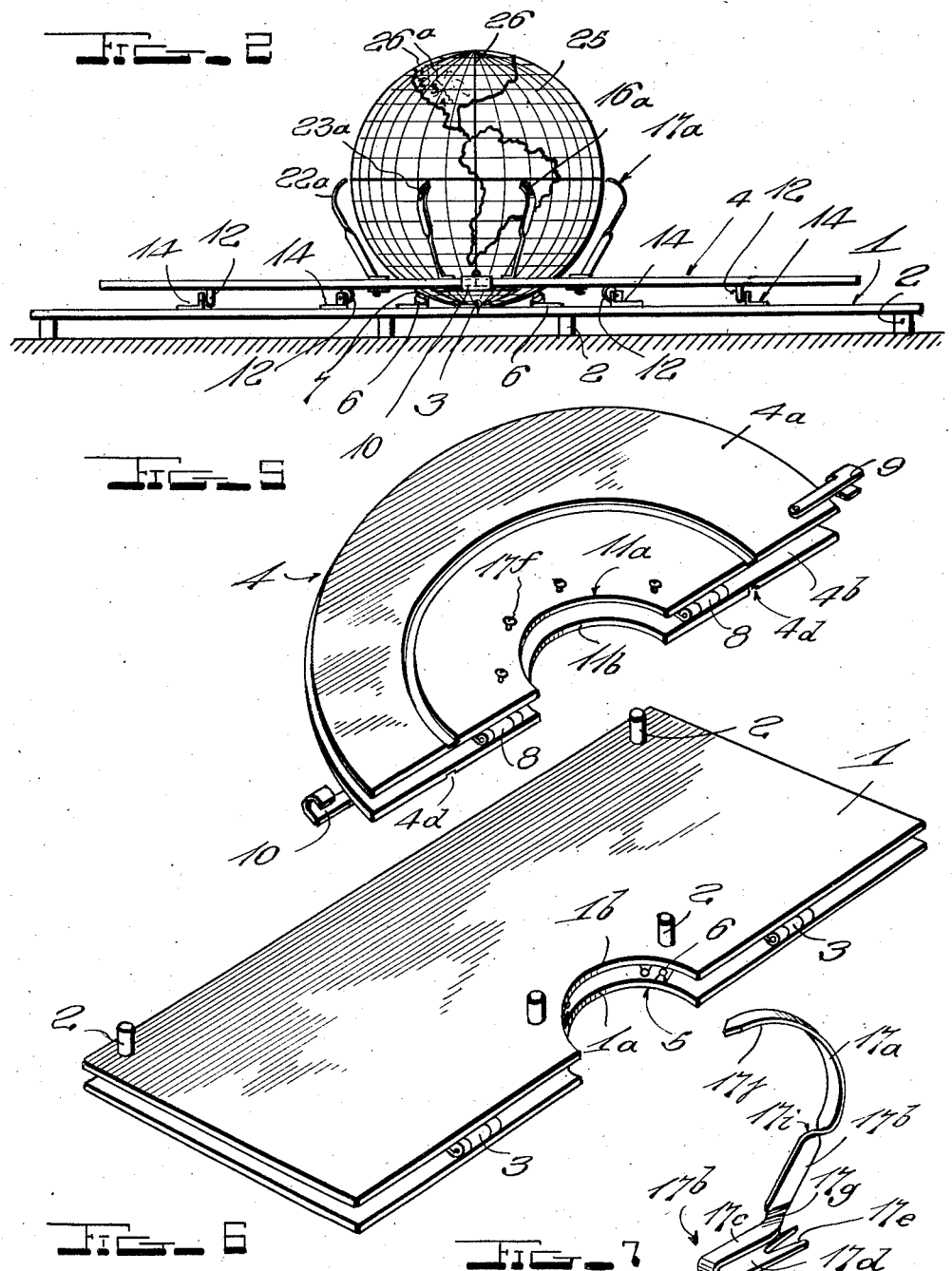

May 7, 1946.　　　J. E. WOOD　　　2,399,902
GAME OF TRAVEL
Filed Jan. 15, 1945　　　4 Sheets-Sheet 3
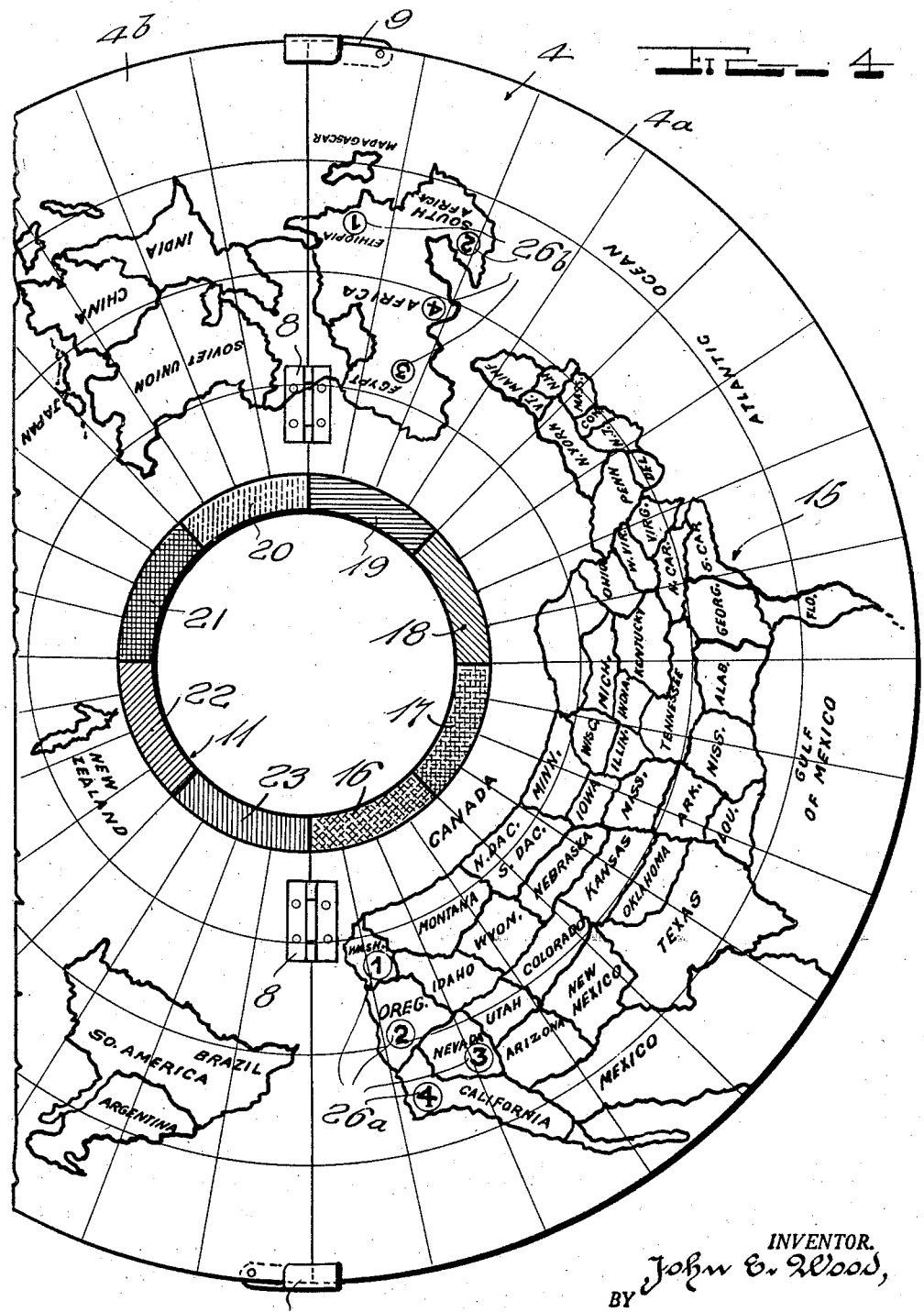

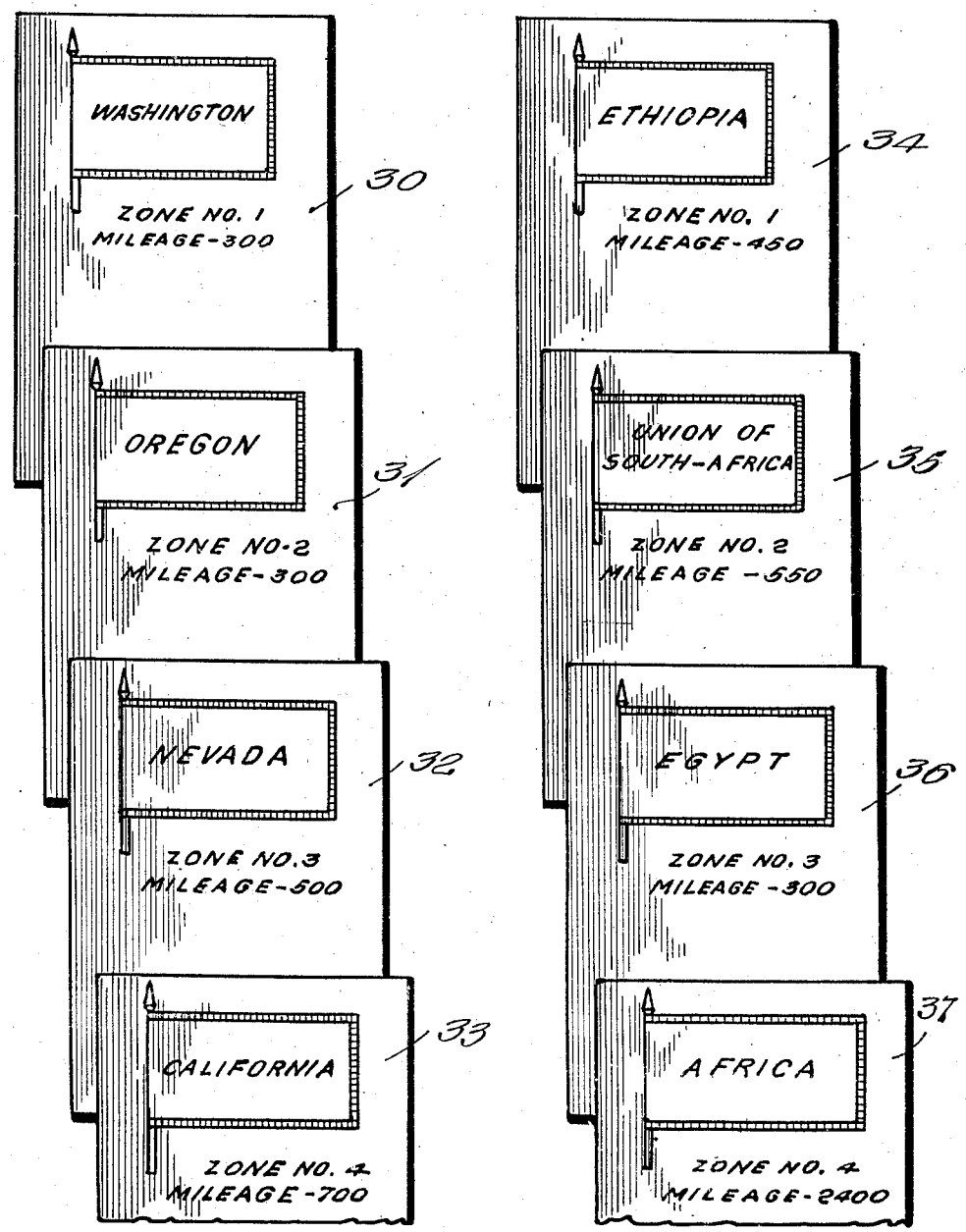

Patented May 7, 1946

2,399,902

UNITED STATES PATENT OFFICE 2,399,902

GAME OF TRAVEL

John E. Wood, Baxley, Ga., assignor to Ernest Law Robarts, Brunswick, Ga.

Application January 15, 1945, Serial No. 572,851

9 Claims. (Cl. 273—136)

My invention relates broadly to educational devices and more particularly to a game of travel combining educational and entertainment features.

One of the objects of my invention is to provide a construction of portable game board for a game of travel providing various permutations and combinations of routes and modes of travel to selected locations in the world for competitively securing the shortest routes to selected locations.

Another object of my invention is to provide a construction of portable game board which includes a universally rotatable globe having a representation of the map of the world thereon, in which the globe is arranged for coaction with a game board having a coacting map of the world thereon facilitating the routing of mileage paths of travel to selected locations represented on the globe.

Still another object of my invention is to provide a construction of portable game board including representations of the map of the world thereon coacting with a globe carrying representations of the map of the world with means for coordinating the globular representation with the game board representation and effecting competitive plays as game progresses through various routes of travel for reaching the selected designations.

Another object of my invention is to provide a coordinated system of playing cards with insignia carried by the universally rotatable globe and a coacting rotatable game board, each of which carries map representations having coordinated insignia thereon.

Another object of my invention is to provide a game of travel in which interest is stimulated and increased by providing obstacles in the route of travel such as storm areas, indicated by certain cards in the deck of cards associated with the game board, and also by providing cards of increased value such as cards representing the Wonders of the World.

Another object of my invention is to provide a parlor game of travel for stimulating public interest in various countries of the world and in various parts of our own country, and to more fully familiarize the general public with the flags of other nations by presenting these features in entertainment form.

Other and further objects of my invention reside in a method and apparatus of playing a game of travel as set forth more fully in the specifications hereinafter following by reference to the accompanying drawings in which:

Figure 1 is a plan view of the portable game board of my invention with the globe mounted for universal movement with respect thereto and illustrating the coordination of the map on the game board with the map carried by the universally rotatable globe; Fig. 2 is a side elevational view of the game board and globe mounted with respect thereto in accordance with my invention; Fig. 3 is a transverse sectional view through the game board and globe associated therewith taken on line 3—3 of Fig. 1; Fig. 4 is an enlarged fragmentary plan view of a portion of the game board of my invention with which the universally rotatable globe coordinates; Fig. 5 is a perspective view of the rotatable portion of the portable game board of my invention shown in folded position; Fig. 6 is a perspective view of the lower portion of the portable game board in folded position; Fig. 7 is a perspective view of one of the indicators associated with the game board and coordinating the representation of the map on the game board with respect to the map on the globe; Fig. 8 is a perspective view of one set of playing cards used in the game of my invention carrying insignia of States of the United States thereon and representative of a portion of the deck of cards; and Fig. 9 is a perspective view of a set of playing cards employed in the game of my invention, showing insignia of countries of the world thereon and representative of a portion of the deck of cards provided in the game of my invention.

My invention includes a portable game-board, approximately the size of a bridge table or smaller, resting on short feet, the board being readily unfoldable from a compact position to support a globe, approximately five or six inches in diameter, showing the map of the world thereon, coacting with indicators carried by the game board. The game-board consists of a pair of superimposed plane members adjacent the base of the globe. One plane member consists of a relatively small, circular, rotatable board resting upon the other plane member, which is larger, square and stationary.

On the inner edge of the circular board, eight segmental spaces are marked off, equal in size but of different distinguishing colors, each space being provided with a pointer or indicator, corresponding in color to the associated segmental space.

The bottom board is square and stationary. In two opposite corners of this board are printed the names of the States and the countries of the globe, together with the zone numbers corresponding to the zone numbers on the circular board or map and on the globe. The alternate two opposite corners contain a printed copy of the rules of the game, thus making the rules readily available and visible to each player.

My game also includes a deck of approximately one hundred cards, each card bearing a number, and being marked with the flag of the country or State represented by that card. Each card shows the road mileage and the plane mileage. Some cards differ in value from others—for instance, cards representing the country or State in which one of the Wonders of the World is located will be double the value of the regular cards.

My game also includes game pieces constituted by miniature cars and planes to be used as the game progresses, to represent the travels of the players.

The globe and indicators are used throughout the game, the first spin of the globe indicating each player's starting-point, the second spin his destination, and each successive spin, taken by the players in rotation, determining the next zone to which the individual player shall advance. The larger portion of the circular rotatable board represents the various countries and States. This board is marked off in zones, with special marks of identification for zones of special value, such as any of the Wonders of the World. This board also provides the surface upon which the miniature cars and airplanes used in the game, are to be moved by the players.

The globe, which is the outstanding feature of my invention, rests upon four or more ball bearings, and is capable of universal rotation and may be turned in any direction desired by the player.

Referring to the drawings in detail, reference character 1 designates the foldable game-board or plane member which is square in shape and of a size to fit upon the usual bridge table and is provided with supporting feet 2, distributed over the bottom thereof as shown. The game-board 1 is divided along its center, and the sections connected by hinged members 3. The hinged members 3 may be suitably recessed into the portions of the game-board 1 in the nature of piano hinges and substantially concealed so that the two portions of the game-board 1 when unfolded are aligned edge to edge for providing a track-way or support for the rotatable circular game-board represented at 4.

The bottom game-board 1 is centrally apertured as represented at 5, the central aperture being completed by the two semi-circular openings 1a and 1b in the bottom game-board 1 as represented in Fig. 6. When unfolded from the compact position illustrated in Fig. 6 to the playing position illustrated in Figs. 1, 2 and 3, the semi-circular openings 1a and 1b are aligned in a plane to provide the aperture 5 represented in Fig. 3. Around the central aperture 5, I mount a multiplicity of ball bearing supports represented at 6 each including a ball bearing 7 therein. The ball bearing support 6 is so mounted relative to ball bearings 7 that the ball bearings 7 are free to revolve universally with minimum friction.

Superimposed upon the game-board 1, I provide a circular game-board 4 which is also foldable along the diametrical line thereof so that parts 4a and 4b may be unfolded from a compact position illustrated in Fig. 5 to the playing position illustrated in Figs. 1, 2, 3, and 4. The portions 4a and 4b of the game-board 4 are connected through the hinged members 8 which may be recessed or imbedded into the surface of the semi-circular portions 4a and 4b of the game-board 4 in the nature of piano hinges. The portions 4a and 4b carry pivotally mounted clip members 9 and 10 adjacent the circumference thereof which are attached to the mouth into a position engaging the aligned edges of the portions 4a and 4b of game-board 4 when the game-board 4 is opened to playing position. The hinged members 9 and 10 have wide engaging faces thereon for maintaining abutting aligned edges of portions 4a and 4b of game-board 4 in the same plane.

The game-board 4 is centrally apertured as represented at 11 formed by semi-circular openings or recesses 11a and 11b in the portions 4a and 4b of game-board 4 as represented in Fig. 5. The under surfaces of portions 4a and 4b of the game-board 4 are each provided with semi-circular track-ways 4c and 4d which when aligned upon the opening of the game-board 4 provide a guide channel in which roller members 12 rotatively journalled on brackets 14 mounted on the lower game-board 1 are free to revolve. The track-way constituted by the annular recesses 4c and 4d is engaged by rollers 12 so that the game-board 4 is free to revolve with respect to game-board 1. The bracket members 14 carried by game-board 1 are arranged in symmetrically spaced positions around game-board 1, providing a multiplicity of points of support for game-board 4 through the rollers 12.

The game-board 4 carries the map-like representation of the world represented generally at 15. The world as depicted on the surface of the game-board 4 is divided into countries and States and the principal cities and oceans and other bodies of water shown thereon. The map-like representation 15 has zone numbers distributed over the principal parts thereof indicated by figures enclosed in circles and for the sake of brevity, indicated in Figs. 1 and 4 at 1, 2, 3 and 4 in different zones, one of which passes through the Pacific Coast area of the map of the United States, and the other of which passes through the Western area of the map representation of Africa. Similarly numbered zones are provided throughout the various zones of the map illustrated at 15.

The aperture 11 of game-board 1 has the inner periphery thereon divided into a multiplicity of variously colored segments which I have represented at 16, 17, 18, 19, 20, 21, 22 and 23 for the purpose of representing the maximum number of players for the game and as attachment positions for the indicator members represented at 16a, 17a, 18a, 19a, 20a, 21a, 22a and 23a shown in Figs. 1, 2, 3 and 7.

The indicators are shown more clearly in the perspective view of Fig. 7 as comprising for indicator 17a a metallic strip having an engaging position 17b formed by a pair of parallel extending portions 17c and 17d that embrace opposite surfaces of the game-board 4 at the inner periphery of aperture 11. The lower one of the parallel extending portions, that is, 17d, is notched at 17e and engages beneath the head of screw member 17f that is secured beneath the bottom of game-board 4. The upper portion of indicator 17a is twisted axially as represented at 17g and is bent outwardly at substantially an obtuse angle with respect to the vertical central axis of the game-board as represented at 17h. The indicator strip is then twisted upon itself again as represented at 17i and then curved into an indicating pointer directed inwardly as represented at 17j. The several indicators are positioned around the inner edge of the aperture 11 individually to each of the circumferential areas 16 to 23, inclusive, and the pointers thereon directed inwardly as shown more clearly in Figs. 2 and 3.

Centrally within this arrangement of pointers I arrange a sphere or globe represented at 25 passing through the central aperture 11 in game-board 4 and resting upon the ball bearings 7 supported on the lower game-board 1. The globe 25 contains the map of the world as represented at 26 with numbered zones thereon, 1, 2, 3, etc., as represented at 26a and 26b mutually coacting with correspondingly numbered zones in map 15 on the game-board 4. Thus the globe is free to be revolved universally with the indicators aligned with any one of the numbered zones on the globe.

The deck of cards employed in the game of my invention numbers one hundred, more or less, divided into groups as represented in Figs. 8 and 9. The group of cards represented by Fig. 8 displays various insignia of States, such as the flag of the State with the zone number applied to the card and the mileage shown on the card. Card 30 illustrated in Fig. 8, for example, shows that the State of Washington is in zone 1 and is assigned a mileage value of 300, whereas card 31 bears the insignia of the State of Oregon which is in zone 2 and has a mileage value of 300. Similarly, card 32 bears the insignia of the State of Nevada, which is in zone 3 and has a mileage value of 500; and according to card 33 which bears the insignia of the State of California, this State is in zone 4 and is assigned a mileage value of 700. In Fig. 9 I have shown cards representative of various countries. Card 34 bears the insignia of Ethiopia and indicates that this country is in zone 1 having a mileage value of 450. Similarly card 35 displays the insignia of the Union of South Africa which is indicated as being in zone 2 having a mileage value of 550. Card 36 displays the insignia of Egypt and has printed thereon the indication of zone 3 with a mileage value of 300. Similarly, card 37 has the insignia of Africa printed thereon with the display of zone 4 and a mileage value of 2400 shown thereon. In addition to such groups of cards by States and countries, cards displaying the Wonders of the World such as the Pyramids of Egypt, shown as being in zone 3 with a mileage value of 300; the Gobi Desert of Mongolia, in China, shown as being in zone 22, with a mileage value of 2500; the Panama Canal, in Panama, shown as being in zone 43, with a mileage value of 400; the Niagara Falls of New York, shown as being in zone 34 with a mileage value of 300; the Grand Canyon of Arizona, shown as being in zone 8, with a mileage value of 450; the redwood trees of California, shown as being in zone 4 with a mileage value of 700; the Victoria Falls, in the Union of South Africa, shown as being in zone 2, with a mileage value of 550, are included in the game of my invention. In the playing of the game, the player who succeeds in drawing any one of these cards actually receives the advantage of a double mileage score for that card.

At the beginning of the game the cards will be shuffled and dealt so that each player will have the same number of cards. The players endeavor to retain and hold in their possession as many cards as possible, as the cards will be used for money or the like. They are also used in tallying the score of each player at the end of the game. Each card will be of a different value as has already been stated. There will be from seven to fourteen cards which will be of much greater value; for instance, a player holding a card representing a country or State containing one of the Seven Wonders of the World would be entitled to twice the value indicated on the card. These cards are to be used as forfeits; for instance, if a player stops in New York city, zone 60, and another player happens to stop in that same zone, the second player must forfeit to the first player the top card of his (the second player's) deck. The cards after being dealt out to the players are not to be shuffled, but are to be held as dealt to them.

Lines of travel are to be used and a player must forfeit a card to the player whose line of travel he has to cross.

The idea of the game is for each player to choose or draw a destination and travel from his starting point to his destination in the quickest way, selecting (if possible) the best means of travel. In other words, each player strives to reach his destination in the shortest time possible and have the most cards on arrival.

The player who gets to his destination first with the most cards on hand and who holds the card bearing the flag of the country or State of his destination is the winner.

The rules of the game of travel are as follows:

RULES OF GAME OF TRAVEL

1. Cards must be shuffled and dealt, each player to receive equal number of cards, which are stacked in front of player exactly in the order of dealing.

2. Each player chooses an indicator and spins the globe twice; first spin of the globe indicates the starting point; second spin of the globe in same manner determines destination or end of journey. Each spin of the globe thereafter, taken in rotation, individually, determines next zone to which player may advance.

3. Unless starting point and destination are within boundaries of the United States of America, player may have choice of mode of travel. If starting point and destination are within the United States, the player uses automobile only. If player must travel to foreign parts, he will choose mode of travel which enables him to reach his destination in the shortest time. Player may refuse or "pass" a move if he thinks it more favorable to him to do so.

4. If at any time one player crosses another player's line of travel, or stops at the same point with another player, he forfeits his top card to that player.

5. To reach destination player must have card bearing flag of that country or State. The winner is the one who reaches destination first with the largest score, and with the flag of the country or State of destination, the score being determined by total mileage of the cards he holds. If two or more players should finish in successive spins, the player with highest score wins the game.

6. Should a player draw one of the Seven Wonders of the World as his destination, all other players forfeit to this player the top card on his deck.

The mileage values for the States and countries and the zone numbers applied thereto are as follows:

States

| State | Zone No. | Mileage |
|---|---|---|
| Washington | 1 | 300 |
| Oregon | 2 | 300 |
| Nevada | 3 | 500 |
| California | 4 | 700 |
| Montana | 5 | 500 |
| Idaho | 6 | 300 |
| Utah | 7 | 400 |
| Arizona | 8 | 450 |
| Wyoming | 9 | 325 |
| Colorado | 10 | 450 |
| New Mexico | 11 | 400 |
| North Dakota | 12 | 450 |
| South Dakota | 13 | 450 |
| Nebraska | 14 | 400 |
| Kansas | 15 | 450 |
| Oklahoma | 16 | 350 |
| Texas | 17 | 800 |
| Minnesota | 18 | 300 |
| Iowa | 19 | 300 |
| Missouri | 20 | 250 |
| Arkansas | 21 | 250 |
| Louisiana | 22 | 250 |
| Wisconsin | 23 | 400 |
| Tennessee | 24 | 250 |
| Mississippi | 25 | 250 |
| Illinois | 26 | 400 |
| Indiana | 27 | 200 |
| Kentucky | 28 | 250 |
| Ohio | 29 | 200 |
| Michigan | 30 | 250 |
| Alabama | 31 | 300 |
| Georgia | 32 | 300 |
| Florida | 33 | 200 |
| New York | 34 | 300 |
| Pennsylvania | 35 | 300 |
| Virginia | 36 | 200 |
| West Virginia | 37 | 200 |
| North Carolina | 38 | 300 |
| South Carolina | 39 | 400 |
| New Jersey | 40 | 100 |
| Massachusetts | 41 | 100 |
| New Hampshire | 42 | 100 |
| Vermont | 43 | 100 |
| Maine | 44 | 300 |
| Rhode Island | 45 | 50 |
| Delaware | 46 | 100 |
| Maryland | 47 | 100 |
| Connecticut | 48 | 150 |
| Washington, D. C. | 49 | |

Countries

| Country | Zone No. | Mileage |
|---|---|---|
| Ethiopia | 1 | 450 |
| Union of South Africa | 2 | 550 |
| Egypt | 3 | 300 |
| Africa | 4 | 2,400 |
| Great Britain | 5 | 250 |
| Russia | 6 | 4,000 |
| India | 7 | 2,000 |
| Norway | 8 | 150 |
| Denmark | 9 | 30 |
| Sweden | 10 | 150 |
| Germany | 11 | 600 |
| Poland | 12 | 400 |
| Hungary | 13 | 350 |
| Switzerland | 14 | 100 |
| Turkey | 15 | 600 |
| France | 16 | 400 |
| Spain | 17 | 250 |
| Netherlands | 18 | 200 |
| Czechoslovakia | 19 | 200 |
| Rumania | 20 | 300 |
| Japan | 21 | 450 |
| China | 22 | 2,500 |
| Australia | 23 | 8,000 |
| New Zealand | 24 | 500 |
| Argentina | 25 | 1,200 |
| Brazil | 26 | 1,600 |
| Guatemala | 27 | 200 |
| Yugoslavia | 28 | 250 |
| Greece | 29 | 200 |
| Mexico | 30 | 1,000 |
| Bolivia | 31 | 400 |
| Belgium | 32 | 150 |
| Portugal | 33 | 100 |
| Costa Rica | 34 | 150 |
| Honduras | 40 | 250 |
| Italy | 41 | 400 |
| Cuba | 42 | 500 |
| Panama | 43 | 400 |
| Finland | 44 | 400 |
| Nicaragua | 45 | 150 |
| Bulgaria | 46 | 200 |
| Canada | 50 | 2,000 |

The game is so arranged that any number of players may play the game at the same time; odd or even number of players. Each player should have the same number of cards; they should be left in a stack in front of that player, just as dealt to him. The players should hold as many cards as possible for they count when adding the score.

Each card is of different value. A player holding a card which represents one of the Seven Wonders of the World receives double the value of that card when adding the score. For example, if the mileage is 200, it would be counted as 400.

The appointed dealer is to deal the cards; he is to spin the globe that is in the center of playing board. The first spin each player looks at his chosen indicator. This tells him his starting point. The dealer spins the globe again a second time. Each player looks to see his destination. His destination is then the nearest zone to where his chosen indicator stops. The dealer again spins the globe. This time it tells each player the zone he is to advance to; he may take the move if it is to his advantage, or he may pass. He does not have to use the move unless he wants to do so.

Each player is provided with one of the game-pieces, that is, the miniature car or plane—this is to be placed on the round map-board at the player's zone number. The round board is to be moved at the beginning of game so the zone number will be in front of the player. The round board is turned clockwise. The players are to move anti-clockwise, to be moved to the advantage of the players. That is to say, the board turns to the left, and the players move to the right.

There are obstacles in the routes of travel. For example, if a player traveling by plane hits a storm area, designated on the map on the rotatable board, he gives his top cards to all players.

The globe and round map on the game board are prepared with great accuracy for educational purposes. The globe and the flat map are each adapted to receive superimposed contours for revising the boundaries of the several countries according to the exigencies of war.

As has been noted, if a player draws a Wonder of the World as his destination all other players give to that player their top card, which results in a penalty for the forfeiting players, thus adding zest to the game.

If a player's starting point and destination are within the United States of America or in a country where the player will not have to pass over water, he will have to use a game piece in the form of a car for transportation, but if the player is going across water or from one country to another the player uses a game piece in the form of a plane.

For each State or country a player passes through the player receives on a score the mileage of that State or country.

The winning player may have the most mileage or the most cards, according to the tallying of the score. The player arriving at the destination first with the most cards and miles and in the possession of a card for that country wins. The score is to be kept with pencil and paper.

Each zone number on the map on the game-board and on the globe is surrounded by a circle and each is of a different distinguishing color.

If a player crosses another player's line of travel he will have to give to that player the top card from his deck.

If a player stops on the same zone as another player he gives that player his top card.

For a player to win he must have the card of the destination. If the player has reached his destination and does not have the card required, he must continue to play until he receives the card of his destination.

If two players reach their destination at the same time the player with the cards of highest value wins the game.

I have found the game of my invention highly practicable for purposes of education, instruction and entertainment. I realize that modifications may be made in the details of arrangement of the game of my invention and I intend no limitations upon my invention other than may be imposed by the scope of the appended claims.

What I claim and desire to secure by Letters Patent of the United States is as follows:

1. A game comprising a pair of foldable game boards superimposed one with respect to the other in spacial relation, one of said game boards having a fixed support and the other of said game boards being rotatably supported with respect to the first mentioned game board, a globe revolvably supported on said first mentioned game board and projecting through said second mentioned game board.

2. A game comprising a pair of game boards each foldable from a compact stored arrangement to an unfolded operative arrangement, one game board being fixedly supported and the other game board being orientatable with respect to the first mentioned game board and in spacial relation with respect thereto and a globe revolvably supported on said first mentioned game board and projecting through said second mentioned game board.

3. A game comprising a pair of game boards each foldable from a compact stored arrangement to an unfolded operative arrangement, one game board being fixedly supported and the other game board being orientatable with respect to the first mentioned game board and in spacial relation with respect thereto, a globe revolvably supported on said first mentioned game board and projecting through said second mentioned game board and a plurality of indicators secured to said second mentioned game board and extending in a vertical direction and directed toward said globe for establishing a reference to map representations carried by said globe.

4. A game comprising a pair of game boards each foldable from a compact stored arrangement to an unfolded operative arrangement, one game board being fixedly supported and the other game board being orientatable with respect to the first mentioned game board and in spacial relation with respect thereto, a globe revolvably supported on said first mentioned game board and projecting through said second mentioned game board and a plurality of indicator members carried by said second mentioned game board and projecting in a substantially vertical direction and directed toward said globe for establishing reference indications with respect to indicia carried on map representations supported by said globe and map representations supported by said second mentioned game board and carrying indicia comparable to the indicia carried by the map representations on said globe.

5. A game comprising a pair of foldable game boards unfoldable from a compact folded position to a plane area, one of said game boards being supportable in fixed position and being centrally apertured and the second game board being supported in rotatable position in superimposed spacial relation to the first mentioned game board, said second mentioned game board being centrally apertured in alignment with the central aperture in said first mentioned game board, sets of revolvable bearings mounted around the interior peripheral edge of said first mentioned game board, a globe revolvably supported by said revolvable bearings and projecting through the apertures in each of said game boards and indicators carried by said second metioned game board and extending in a substantially vertical direction and directed toward map representations carried by said globe for establishing references to the map representations carried by said globe.

6. A game comprising a pair of foldable game boards unfoldable from a compact folded position to a plane area, one of said game boards being supportable in fixed position and being centrally apertured and the second game board being supported in rotatable position in superimposed spacial relation to the first mentioned game board, said second mentioned game board being centrally apertured in alignment with the central aperture in said first mentioned game board, sets of revolvable bearings mounted around the interior peripheral edge of said first mentioned game board, a globe revolvably supported by said revolvable bearings and projecting through the apertures in each of said game boards and indicators secured at spaced positions around the interior peripheral edge of the apertured second mentioned game board and directed substantially vertical and terminating in directions toward said globe for establishing reference indications with the map representations carried by said globe.

7. A game comprising a pair of game boards, one of said game boards being supported in fixed position and the second of said game boards being orientatably mounted with respect to the first mentioned game board, said second mentioned game board being centrally apertured with the internal peripheral portion thereof divided into segmental areas of distinguishing color characteristics, an indicator individual to each of the segmental areas and extending upwardly and outwardly with respect thereto and terminating in pointers directed radially inwardly, and a globe revolvably supported on said first mentioned game board and projecting through the apertured portion of said second mentioned game board within the area occupied by said indicators, said globe carrying map representations thereon with which said indicators are arranged to coact.

8. A game comprising a pair of game boards, one of said game boards being supported in fixed position and the second of said game boards being orientatably mounted with respect to the first mentioned game board, said second mentioned game board being centrally apertured with the internal peripheral portion thereof divided into segmental areas of distinguishing color characteristics, an indicator individual to each of the segmental areas and extending upwardly and outwardly with respect thereto and terminating in pointers directed radially inwardly, a globe revolvably supported on said first mentioned game board and projecting through the apertured portion of said second mentioned game board within the area occupied by said indicators, said globe carrying map representations thereon with which said indicators are arranged to coact, and map representations carried by the surface of said second mentioned game board and having indicia thereon comparable to the indicia carried by the map representations on said globe.

9. A game comprising a pair of game boards, each foldable from a compact folded position to plane positions, the first of said game boards being fixedly supported, roller means carried by the upper surface of the first of said game boards, a second game board revolvably mounted on said roller means for orientatable adjustment with respect to said first game board, said second game board being centrally apertured, a globe revolvably supported by said first mentioned game board and projecting through the centrally apertured second mentioned game board, the interior periphery of the apertured portion of the second mentioned game board being divided into segmental areas distinguishable one from the other, indicators individual to each of said segmental areas and attachable to the interior periphery of the apertured portion of said second mentioned game board, said indicators projecting in a substantially vertical direction and having portions thereof directed toward said globe, map representations carried by said globe with indicia thereon, map representations carried by the top surface of said second game board and having corresponding indicia thereon whereby comparison may be effected between indicia on said second mentioned game board and indicia on said globe as said globe is revolvably moved with reference to said indicators.

JOHN E. WOOD.